United States Patent
Kusase

(10) Patent No.: US 10,193,428 B2
(45) Date of Patent: Jan. 29, 2019

(54) ELECTRIC ROTATING MACHINE

(71) Applicant: DENSO CORPORATION, Kariya, Aichi-pref. (JP)

(72) Inventor: Shin Kusase, Kariya (JP)

(73) Assignee: DENSO CORPORATION, Kariya (JP)

(*) Notice: Subject to any disclaimer, the term of this patent is extended or adjusted under 35 U.S.C. 154(b) by 491 days.

(21) Appl. No.: 14/874,995

(22) Filed: Oct. 5, 2015

(65) Prior Publication Data

US 2016/0099618 A1    Apr. 7, 2016

(30) Foreign Application Priority Data

Oct. 3, 2014   (JP) ................. 2014-205031

(51) Int. Cl.
*H02K 16/02* (2006.01)
*H02K 19/10* (2006.01)
*H02K 19/12* (2006.01)
*H02K 21/44* (2006.01)

(52) U.S. Cl.
CPC .......... *H02K 16/02* (2013.01); *H02K 19/103* (2013.01); *H02K 19/12* (2013.01); *H02K 21/44* (2013.01); *H02K 2213/03* (2013.01)

(58) Field of Classification Search
CPC .. H02K 16/02; H02K 2201/12; H02K 19/103; H02K 19/12
USPC ....................................................... 310/266
See application file for complete search history.

(56) References Cited

U.S. PATENT DOCUMENTS

| | | | | |
|---|---|---|---|---|
| 4,731,554 A | * | 3/1988 | Hall | H02K 29/08 310/156.26 |
| 7,525,230 B1 | * | 4/2009 | Gabrys | H02K 3/47 310/179 |
| 8,847,464 B2 | * | 9/2014 | Qu | H02K 16/02 310/114 |
| 2002/0047418 A1 | * | 4/2002 | Seguchi | F02N 11/04 310/114 |
| 2003/0102764 A1 | * | 6/2003 | Kusase | H02K 1/27 310/266 |
| 2008/0036330 A1 | * | 2/2008 | Abe | H02K 16/00 310/268 |
| 2008/0088200 A1 | * | 4/2008 | Ritchey | H02K 16/00 310/268 |

FOREIGN PATENT DOCUMENTS

JP      2013-236418 A    11/2013

* cited by examiner

Primary Examiner — Jeremy A Luks
(74) Attorney, Agent, or Firm — Oliff PLC

(57) ABSTRACT

In an electric rotating machine, a stator has an armature coil wound around an armature core segments with M pairs of poles, and N pairs of field sources (field coil and field magnetic field), a rotor has K soft magnetic members including a plurality of protrusions on a side facing the stator, and the armature coil, the field sources, and the soft magnetic members satisfy a relational expression of $|M \pm N|=K$. With this configuration, rotors are rotated based on the magnetic modulation principle, so that field poles can have alternating electromagnetic action on the armature coil, and the performance of the electric rotating machine can be improved with a brushless structure.

8 Claims, 12 Drawing Sheets

(RADIALLY OUTWARD)

(RADIALLY INWARD)

ELECTRIC ROTATING MACHINE

CROSS-REFERENCE TO RELATED APPLICATION

This application is based on and claims the benefit of priority from earlier Japanese Patent Application No. 2014-205031 filed Oct. 3, 2014, the descriptions of which are incorporated herein by reference.

BACKGROUND

Technical Field

The present invention relates to an electric rotating machine that has a stator and rotors.

Related Art

Techniques relating to motors for hybrid electric vehicles (HEVs) are known. Such a motor for an HEV is a high output motor which is called an interior permanent magnet (IPM) motor. Such an IPM motor makes use of magnet torque and reluctance torque. However, the permanent magnets exerting magnet torque require extra supply of armature current in a reverse magnetic field direction for weak magnetic field, with the increase of induced electromotive force in high-speed rotation. This raises a problem of increasing current loss or causing drag loss due to magnetic attractive force in an unloaded state.

When electromagnets are applied instead of the permanent magnets, a variable field can be created and thus the above problem can be solved. In the application of the electromagnets, current may be supplied by providing a configuration including a brush and a slip ring. However, this raises a problem of impairing reliability and increasing an entire dimension and cost due to addition of a large number of components. Variable magnetic field may be generated in the form of an induction machine or a switched reluctance motor without using a brush. However, this raises a problem of damaging a bearing, providing insufficient endurance against centrifugal force, or causing noise and vibration, due to heat generation of the rotor accompanying the current supply. For this reason, a simple electric rotating machine is desired to be provided, which variably generates a magnetic field with a brushless structure, serves as a generator and a motor, prevents heat generation by a rotor, and has endurance against centrifugal force.

For example, Japanese Patent Application Laid-Open Publication No. 2013-236418 discloses an example of a technique related to an electric rotating machine. This electric rotating machine aims to reduce deformation of the bridges while securing the length of each bridge in a rotor. According to this electric rotating machine, an outer circumferential side portion and an inner circumferential side portion forming each gap in a rotor core are connected by a pair of bridges, with a permanent magnet being inserted into the gap.

However, if the technique disclosed in Japanese Patent Application Laid-Open Publication No. 2013-236418 is applied, permanent magnets are still required to be used. Accordingly, extra armature current is required to be supplied, again raising a problem of increasing current loss or causing drag loss due to magnetic attractive force in an unloaded state.

SUMMARY

The present disclosure was made based on an idea that, if field poles are configured to be generated in a stator by supplying current to a winding applied to the stator, and a rotor is formed of only a soft magnetic material, all of the above problems are solved. It is thus desired to provide a simple electric rotating machine which variably generates a magnetic field with a brushless structure, serves as a generator and a motor, prevents heat generation of a rotor, and has endurance against centrifugal force.

To achieve the above object, according to a first aspect the present disclosure, an electric rotating machine includes: a stator serving as an armature including at least armature core segments and an armature coil; and rotors rotatably provided relative to the stator with gaps therebetween. In the electric rotating machine, the stator has the armature coil wound around the armature core segments with M pairs of poles (M being a natural number), and N pairs of field poles (N being a natural number). The rotors have K (K being a natural number) soft magnetic members including a plurality of protrusions on a side facing the stator. The armature coil, the field poles, and the soft magnetic members satisfy a relational expression of $|M \pm N|=K$.

With this configuration, a new second rotation magnetic field is generated in the stator, from an armature rotation magnetic field of M pairs of poles and a static field magnetic field of N pairs of poles. The rotors serving as modulators are rotated by the second rotation magnetic field. Since the rotors are rotated based on the magnetic modulation principle, the performance of the electric rotating machine can be improved with a brushless structure.

According to a second aspect, the N pairs of field poles are field poles generated by supplying current to the field coil wound around the armature core segments, or field poles generated by supplying zero-phase current or asymmetrical three-phase alternating current obtained by superimposing direct-current components on the armature coil.

With this configuration, the field poles may be generated by supplying current to the field coil wound around the armature core segments, or may be generated by supplying zero-phase current or asymmetrical three-phase alternating current obtained by superimposing direct-current components on the armature coil. At any rate, since the field poles are reliably generated in the rotor, the magnetic modulation principle acts and performance (e.g., output or counter electromotive force) of the electric rotating machine can be improved with a brushless structure.

According to a third aspect, the electric rotating machine includes the plurality of rotors arranged sandwiching the stator via the gaps.

With this configuration, a gap area serving as a torque generation surface increases, and thus the performance of the electric rotating machine can be improved. The gap area corresponds to portions through which the magnetic flux traverses the stator and the rotors via the gaps.

The coil is also referred to as a winding. The field pole may be generated by supplying current to the field coil, or may be generated by supplying asymmetrical three-phase alternating current to the armature coil, regardless of presence/absence of the field coil. The armature coil and the field coil each include a plurality of conductor wire segments electrically connected to each other for integration, and only have to include three or more phases. The electric rotating machine may be any machine that has a rotating member (e.g., a shaft). For example, an electric generator, an electric motor, and an electric motor-generator correspond to the electric rotating machine.

DETAILED DESCRIPTION OF THE PREFERRED EMBODIMENTS

Figure 1:
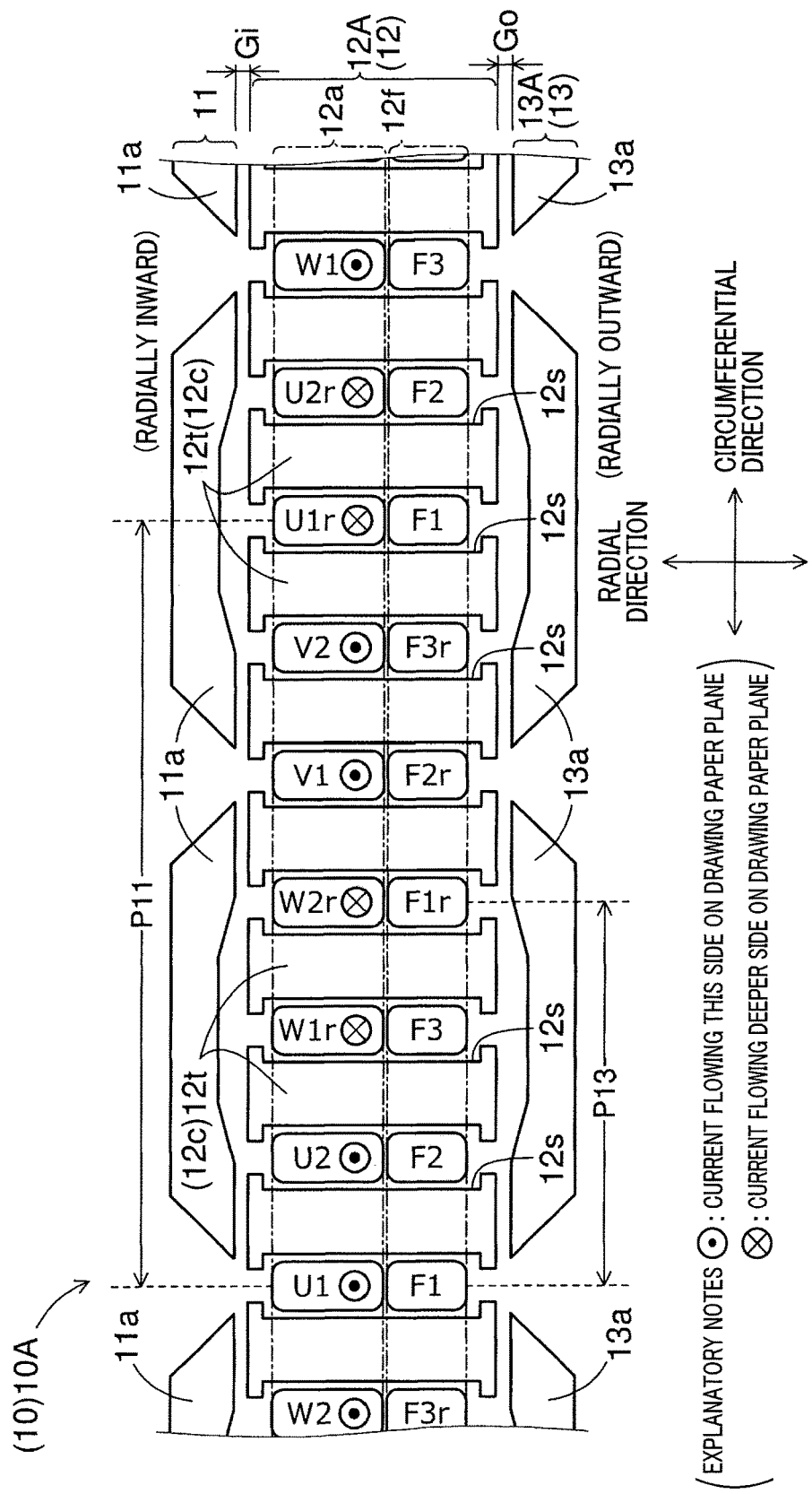
FIG. 1 is a schematic diagram illustrating a first configuration example of an electric rotating machine.

With reference to the accompanying drawings, hereinafter are described several embodiments of the present invention. In the following description, where the expressions connect (ed), connection or connecting are used, these expressions respectively refer to electrically connect(ed), electrical connection, or electrically connecting, unless otherwise specified. The drawings show only elements necessary for describing the present invention and do not necessarily show all of actual elements. For clarity, hatching is minimized in the drawings, and therefore some elements are not hatched in cross sections. When directions, such as upward, downward, rightward and leftward, are mentioned, the directions are based on the drawings. A series of alphanumeric reference signs is abbreviated using a word to. A capital-letter reference sign and a small-letter reference sign are designated to different elements. For example, a rotor 13A and a rotor segment 13a are different elements. An expression radially outward refers to an outer side or an outer circumferential side in a radial direction and an expression radially inward refers to an inner side or an inner circumferential side in a radial direction.

First Embodiment

With reference to FIGS. 1 to 5, a first embodiment of the present invention will be described. FIG. 1 is a schematic diagram illustrating a first configuration example of an electric rotating machine 10A according to the first embodiment. The electric rotating machine 10A shown in FIG. 1 is an example of an electric rotating machine 10. The electric rotating machine 10A includes rotors 11 and 13A and a stator 12A. Except for the rotors and the stator, the essential elements for configuring the electric rotating machine 10A (e.g., rotary shaft, bearing, and a housing) are not shown or described. In FIG. 1, for clarity, the rotors 11 and 13A, and the stator 12A are linearly arranged in a right-and-left direction. However, actually, the individual elements are circumferentially arranged (refer to FIGS. 8 to 10).

Both the rotors 11 and 13A, which correspond to modulators, are rotatably provided. The rotor 11 is a rotor located radially inward and includes a plurality of (K in the present embodiment) rotor segments 11a. The rotor 13A is located radially outward and includes a plurality of (K in the present embodiment) rotor segments 13a. The rotor segments 11a and 13a are formed of soft a magnetic material to generate field poles when current is supplied to a field coil 12f. Circumferentially adjacent rotor segments 11a, as well as circumferentially adjacent rotor segments 13a are magnetically isolated from each other. All the rotor segments 11a and 13a are directly or indirectly fixed to a rotary shaft, not shown.

The rotor segments 11a and 13a, when indirectly fixed to the rotary shaft, are fixed to a member to be fixed (e.g., bridge or frame) (hereinafter referred to as to-be-fixed member) made, for example, of a non-magnetic material, or are formed as a part of the rotor cores. In both cases, any fixing method may be used. In short, the rotor segments 11a and 13a only have to be fixed to the rotary shaft so as to be synchronously rotated. In the present embodiment, the rotors 11 and 13A are fixed so as to be synchronously rotated.

The stator 12A, which is an example of a stator 12, is provided between the rotors 11 and 13A. A gap Gi is formed between the rotor 11 and the stator 12A, while a gap Go is formed between the stator 12A and the rotor 13A. The magnitude relationship of the gaps Gi and Go is not discussed.

The stator 12A has an armature coil 12a, the field coil 12f, core teeth 12t, and slots 12s. Both the armature coil 12a and the field coil 12f are accommodated in the slots 12s and wound around the core teeth 12t. The core teeth 12t each form a part of an armature core segment 12c and have ends (ends in a radial direction in FIG. 1) provided with protrusions protruded in a circumferential direction. As shown in FIG. 1, the core teeth 12t according to the present embodiment are formed in a rectangular shape, except for the ends. The slots 12s are coil accommodation spaces formed between the circumferentially provided core teeth 12t. The number of coil segments that can be accommodated may be optionally determined. When current is supplied to the armature coil 12a, a plurality of magnetic poles (M pairs of poles in the present embodiment) are generated to act as the stator 12A. When current is supplied to the field coil 12f, a plurality of field poles (N pairs of poles in the present embodiment) are generated in the stator 12A.

Figure 3:
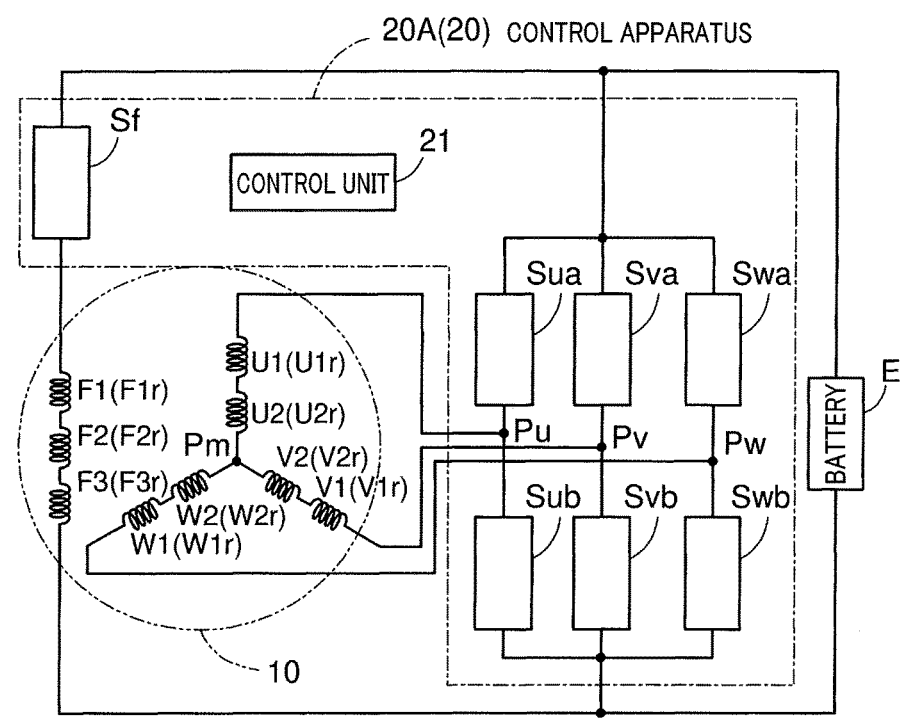
FIG. 3 is a schematic diagram illustrating a first configuration example of a control apparatus.

The armature coil 12a is composed of coil segments of a plurality of phases (three phases in the present embodiment). The cross-sectional shape of the coil segments is not discussed. In the configuration example of FIG. 1, the armature coil 12a is composed of U-phase coil segments U1 (U1r) and U2 (U2r), V-phase coil segments V1 (V1r) and V2 (V2r), and W-phase coil segments W1 (W1r) and W2 (W2r). One or more coil segments of each phase are accommodated in one slot 12s. As shown in FIG. 3, the U-phase coil segments U1 (U1r) and U2 (U2r) are connected in series. Likewise, the V-phase coil segments V1 (V1r) and V2 (V2r) are connected in series, and the W-phase coil segments W1 (W1r) and W2 (W2r) are connected in series.

A reference sign r is added to those coil segments through which current flows in a direction reverse of a direction of the current flowing through the U-, V- and W-phase coil segments U1 and U2, V1 and V2, and W1 and W2. For example, the U-phase coil segment U1r is a part of the U-phase coil segment U1 and a direction of the current flowing through the U-phase coil segment U1r is reverse of the current flowing through the U-phase coil segment U1 (refer to explanatory notes shown in FIG. 1). An interval from the U-phase coil segment U1 to the U-phase coil segment U1r (six slots in the configuration example of FIG. 1) corresponds to coil ends CE (refer to FIG. 2) described later. The interval is referred to as an armature coil pole pitch P11. The addition of the reference sign r, as well as the armature coil pole pitch P11, is similarly applied to the rest of the armature coil 12a, i.e. the V- and W-phase coil segments V1 (V1r) and W1 (W1r).

The field coil 12f is composed a plurality of coil segments (three in the present embodiment). The cross-sectional shape of the coil segments is not discussed. In the configuration example of FIG. 1, the field coil 12f is composed of field coil segments F1 (F1r), F2 (F2r) and F3 (F3r). One or more field coil segments are accommodated in one slot 12s. Similar to the armature coil 12a, a reference sign r is added to those coil segments through which current flows in a direction reverse of the direction of the current flowing through the field coil segments F1, F2 and F3. That is, the field coil segment F1r is a part of the field coil segment F1 wound around the core teeth 12t and the current of the direction reverse of the current flowing through the field coil segment F1 flows through the field coil segment F1r. An interval from the field coil segment F1 to the field coil segment F1r (three slots in the configuration example of FIG. 1) corresponds to the coil ends CE (refer to FIG. 2) described later. The interval is referred to as a field coil pole pitch P13. The addition of the reference sign r, as well as the field coil pole pitch P13, is similarly applied to the rest of the field coil 12f, i.e. field coil segments F1 (F1r), F2 (F2r) and F3 (F3r).

Figure 2:
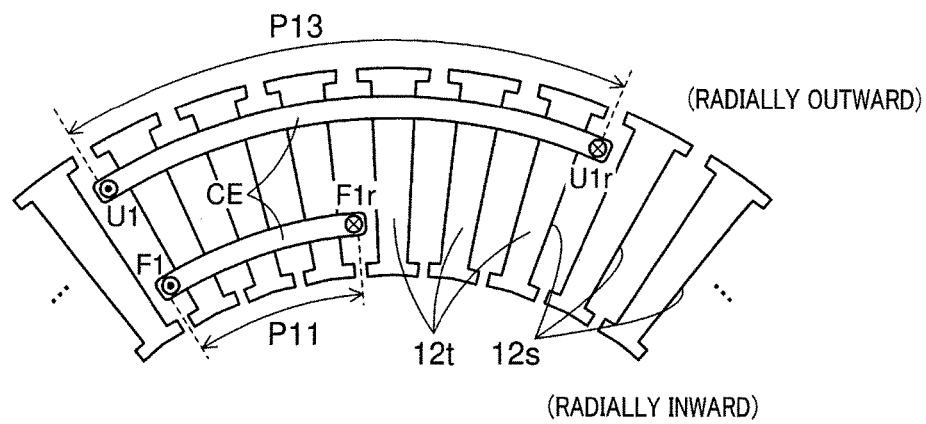
FIG. 2 is a schematic diagram partially illustrating an array of an armature and a field coil in an armature core.

A winding example of the field coil 12f and a relationship of the field coil segments F1, F2, and F3 with the field coil segments F1r, F2r, and F3r are as shown in FIG. 2. The arrow in FIG. 2 indicates the direction of current. However, the current may flow in a direction reverse of the one indicated in FIG. 2. A portion accommodated in the slot 12s in each coil segment is an in-slot portion and portions protruding from each armature core segment 12c without being accommodated in the slot 12s are the coil ends CE (refer to FIG. 2). In FIG. 2, the coil end CE between the U-phase coil segments U1 and U1r, as well as the coil end CE between the field coil segments F1 and F1r, is shown as a representative example. Although not shown, the same applies to the coil segments of the other phases. Hereinafter, the reference sign r is omitted unless otherwise specified.

Reference sign M that is the number of pairs of magnetic poles generated by the armature coil 12a, reference sign N that is the number of pairs of field poles generated by supplying current to the field coil 12f, and K that is the number of rotor segments 11a and 13a are determined so as to satisfy a relational expression of $|M \pm N|=K$. By satisfying the relational expression, the magnetic modulation principle acts between the stator 12A, and the rotors 11 and 13A and magnetic transmission torque is generated. Hereinafter, a combination of M=6 (distributed winding q=2), N=12 (distributed winding q=3), and K=18 satisfying a relational expression of M+N=K is described as a representative example.

With reference to FIG. 3, a control apparatus 20 controlling the electric rotating machine 10A configured as described above will be described. FIG. 3 is a schematic diagram illustrating a first configuration example of a control apparatus 20A. The control apparatus 20A shown in FIG. 3 is an example of a control apparatus 20, and corresponds to an electronic control unit (ECU) or a computer. The control apparatus 20A has a control unit 21 and switching units Sua, Sva, Swa, Sub, Svb, Swb, and Sf.

The control unit 21 controls the electric rotating machine 10A so as to serve as an electric motor or as an electric generator. The control unit 21 outputs an ON/OFF control signal to each of the switching units Sua, Sva, Swa, Sub, Svb, Swb, and Sf (signal lines and signals are not shown). In the control of operating the electric rotating machine 10A as an electric motor, the control unit 21 receives power supplied from a battery E to individually ON/OFF control the switching units Sua, Sva, Swa, Sub, Svb, Swb, and Sf, for power conversion, and pass current to the armature coil 12a or the field coil 12f. In the control of operating the electric rotating machine 10A as an electric generator, the control unit 21 receives counter electromotive force generated in the armature coil 12a and charges the battery E via the switching units Sua, Sva, Swa, Sub, Svb, Swb, and Sf. The battery E corresponds to a power source that is a rechargeable secondary battery. The number of batteries E or a capacity thereof is not discussed. It should be noted that a power source (e.g., a solar battery or an electric generator) other than the secondary battery may be included in the battery E.

Each of the switching units Sua, Sva, Swa, Sub, Svb, Swb, and Sf includes an optionally selected switching element (semiconductor element) enabling switching operation. For example, a FET (specifically, MOSFET, JFET, or MESFET), IGBT, GTO, or a power transistor may be used as the switching element. Each of the switching units may include a diode functioning as a freewheel diode, a drive circuit to drive a switching element on the basis of a control signal transmitted from the control unit 21, or elements or circuits necessary for performing switching.

The switching units Sua and Sub are connected in series. Likewise, the switching units Sva and Svb, as well as the switching units Swa and Swb, are connected in series. As shown in FIG. 3, the serial connection of the switching units Sua and Sub, the serial connection of the switching units Sva and Svb, and the serial connection of the switching units Swa and Swb are connected in parallel for connection to both ends of the battery E. The switching units Sua and Sub have connection point Pu therebetween which is connected to the U-phase coil segments U1 and U2 connected in series. The switching units Sva and Svb A have a connection point Pv therebetween which is connected to the V-phase coil segments V1 and V2 connected in series. The switching units Swa and Swb have a connection point Pw therebetween which is connected to the W-phase coil segments W1 and W2 connected in series. An end of each of the U-, V- and W-phase coils U2, V2 and W2 is connected to a neutral point Pm. A switching unit Sf and the field coil segments F1, F2, and F3 are connected in series, while being connected to both ends of the battery E.

Figure 4:
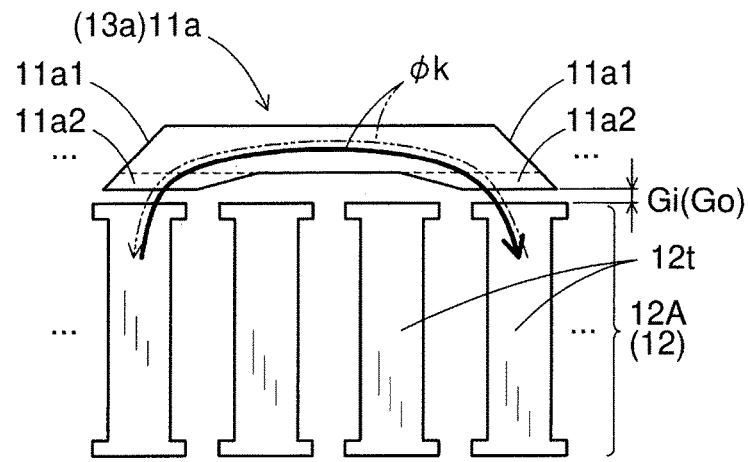
FIG. 4 is a schematic diagram illustrating magnetic flux flowing between soft magnetic members and armature core segments.

In the control apparatus 20A, when the electric rotating machine 10A is controlled as an electric motor, a modulation magnetic flux ϕk shown in FIG. 4 flows. The rotor segments 11a and 13a each have the same configuration and function. Hereinafter, the rotor segments 11a are described as a representative example. In FIG. 4, the armature coil 12a and the field coil 12f are omitted.

The rotor segment 11a shown in FIG. 4 includes chamfered portions 11a1 and protrusions 11a2. The chamfered portions 11a1 are obtained by chamfering both circumferential end faces (right-and-left end faces in FIG. 4) of the rotor segment 11a. The protrusions 11a2 correspond to both circumferential ends of the rotor segment 11a and are provided on a side facing the stator 12 (core teeth 12t).

The modulation magnetic flux ϕk circumferentially traverses the rotors 11 and 13A that serve as modulators. The modulation magnetic flux ϕk shown in FIG. 4 flows from a core tooth 12t (left end in FIG. 4) to a protrusion 11a2 on one side (left end in FIG. 4) via the gap Gi. After flowing through the rotor segment 11a, the modulation magnetic flux ϕk flows from a protrusion 11a2 on the other side (right end in FIG. 4) to another core tooth 12t (right end in FIG. 4) via the gap Gi. As shown in FIG. 4, the modulation magnetic flux ϕk flows through the core tooth 12t closest to the protrusion 11a2 via the gap Gi. With the flow of the modulation magnetic flux ϕk in this way, the rotor 11 is rotated on the basis of the magnetic modulation principle.

Although not shown, the modulation magnetic flux ϕk also flows between the rotor segment 13a and the core tooth 12t, similar to the manner described above. The modulation magnetic flux ϕk flows through both the rotor segments 11a and 13a of the rotors 11 and 13A, respectively, and thus a gap area serving as a torque generation surface increases to thereby improve the performance of the electric rotating machine 10A. The gap area corresponds to an area of the surface of each of the rotor segments 11a and 13a, which surface faces the core teeth 12t in the gaps Gi and Go.

Figure 5:
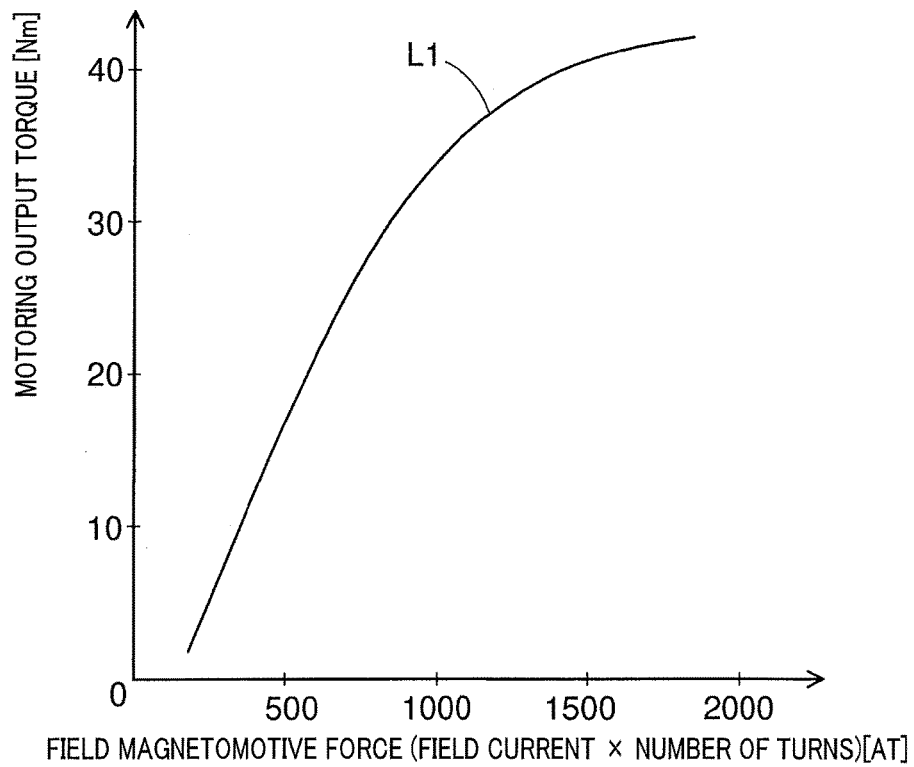
FIG. 5 is a graph illustrating an example of a relationship between motoring output torque and field magnetomotive force.

FIG. 5 shows an example of a relationship between motoring output torque [Nm] and field magnetomotive force [ampere-turn (AT)] when the electric rotating machine 10A is operated as an electric motor. As the field magnetomotive force increases, the motoring output torque increases as shown by the characteristic line L1. The characteristic line L1 indicated by a solid line in FIG. 5 is obtained under the following conditions.

(a) The rotors 11 and 13A and the stator 12A each have an outer diameter of 130 [mm].

(b) The armature core segments 12c each have a thickness of 40 [mm] in a radial direction.

(c) The rotation number is 200 [rpm].

(d) The armature coil 12a and the field coil 12f are supplied with current of 170 [A·rms/phase].

(e) The number of turns per slot is 10.

If any condition described above changes, the characteristic line L1 also changes. However, the characteristic line L1 generally shows the increasing trend of FIG. 5.

Through the current supply to the field coil 12f of the stator 12A, static field poles are generated. Through the current supply to the armature coil 12a, an armature rotation magnetic field ATa is generated. Further, by synergistic action of the above, a second rotation magnetic field AT2 (e.g., refer to FIGS. 14 to 17) is generated in the stator 12A. The rotors 11 and 13A that serve as modulators are rotated in synchronization with the second rotation magnetic field AT2. Based on the magnetic modulation principle, the second rotation magnetic field AT2 (dynamic field) is generated by a static field magnetic field ATf. Accordingly, it is not necessary to mount a coil or permanent magnets to the rotors 11 and 13A. Therefore, a variable field system is achieved under brushless excitation. For this reason, an extra current for cancelling direct-axis magnetic flux is not required to be passed to the armature coil 12a. Thus, current loss is minimized, and drag loss is not caused in an unloaded state by magnetic attractive force that is brought about by the remaining magnetic flux.

Second Embodiment

Figure 6:
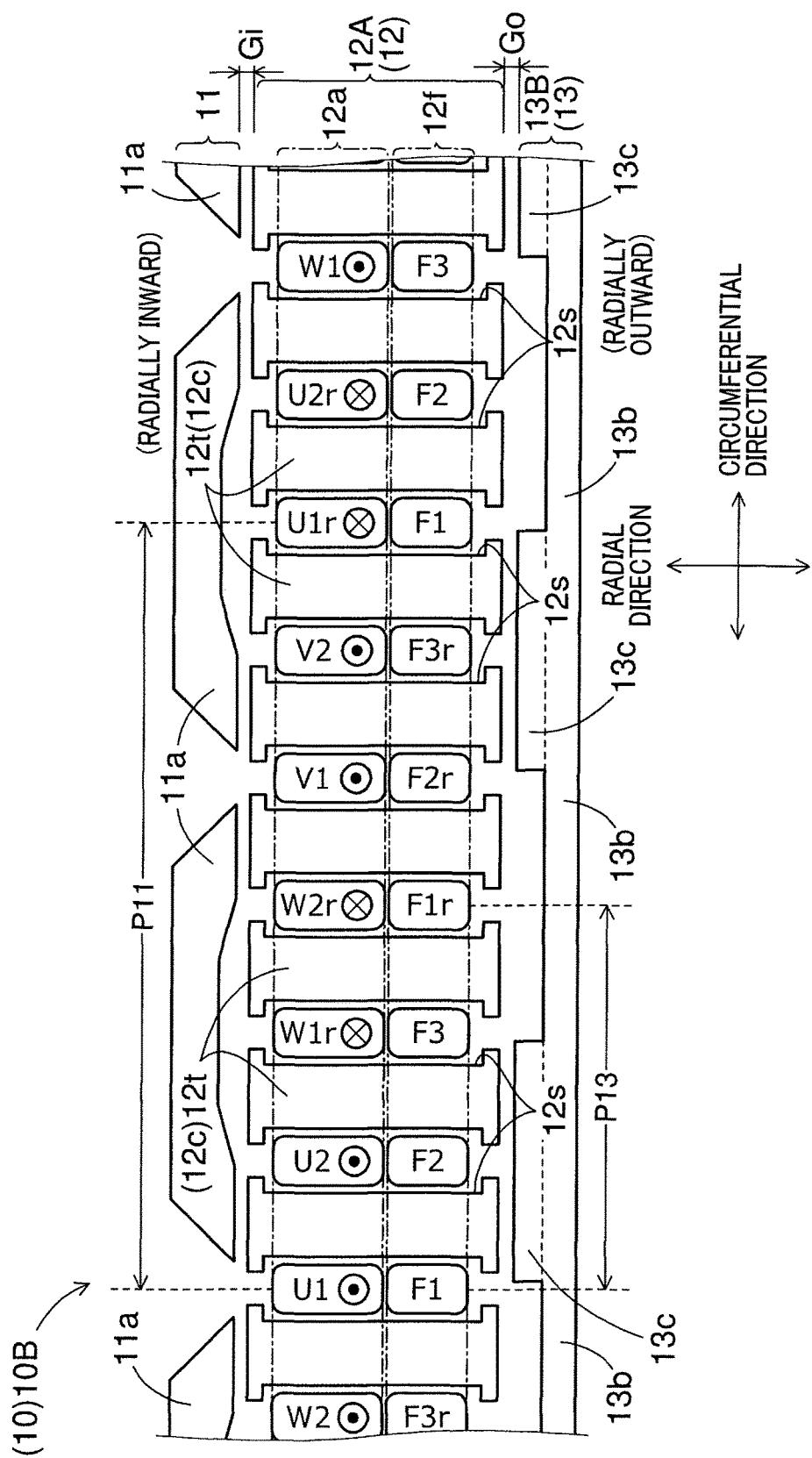
FIG. 6 is a schematic diagram illustrating a second configuration example of an electric rotating machine.
Figure 7:
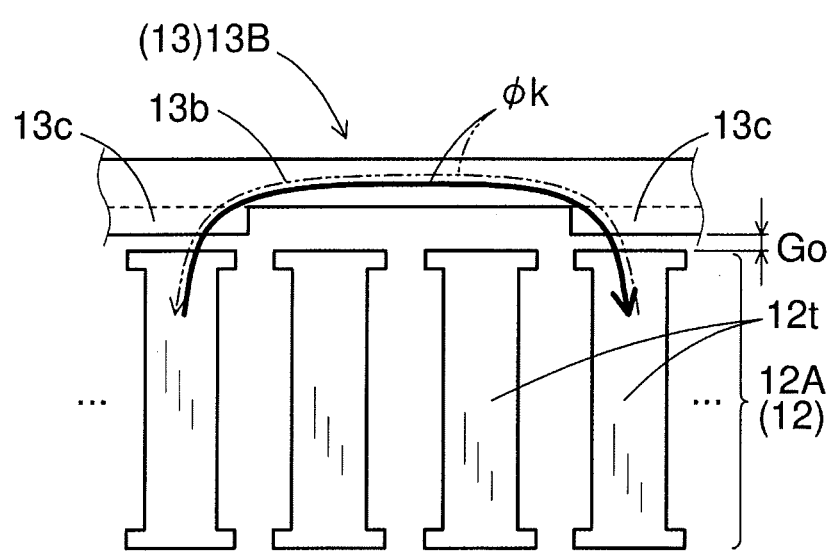
FIG. 7 is a schematic diagram illustrating magnetic flux flowing between soft magnetic members and armature core segments.

With reference to FIGS. 6 and 7, a second embodiment of the present invention will be described. It should be noted that, in the second and the subsequent embodiments, unless otherwise specified, the components identical with or similar to those in the first embodiment are given the same reference signs for the sake of omitting unnecessary description. The following description is focused on the differences from the first embodiment.

FIG. 6 is a schematic diagram illustrating a configuration example of an electric rotating machine 10B according to the second embodiment. The electric rotating machine 10B shown in FIG. 6 is an example of an electric rotating machine 10. The electric rotating machine 10B includes rotors 11 and 13B and a stator 12A. Similar to the first embodiment, except for the rotors and the stator, the essential elements for configuring the electric rotating machine 10B are not shown or described. In FIG. 6 as well, for clarity, the rotors 11 and 13B and the stator 12A are linearly arranged in a right-and-left direction. However, the individual elements are actually arranged in a circumferential direction (e.g., refer to FIGS. 8 to 10).

The electric rotating machine 10B is different from the first embodiment in that the electric rotating machine 10B includes the rotor 13B made of a soft magnetic material, instead of the rotor 13A (refer to FIG. 1). The rotor 13B corresponds to the rotor located radially outward, and has a rotor core 13b and a plurality of (K in the present embodiment) salient poles 13c. The plurality of salient poles 13c are protrusions that protrude from the rotor core 13b toward the stator 12A (core teeth 12t). The salient poles 13c have a function similar to that of the rotor segments 13a described in the first embodiment. Therefore, when current is supplied to a field coil 12f, a plurality of field poles (N pairs in the present embodiment) are generated in the stator 12A.

In a control apparatus 20A, when the electric rotating machine 10B is operated as an electric motor, modulation magnetic flux ϕk shown in FIG. 7 flows. As described in the first embodiment (refer to FIG. 4), a flow of magnetic flux is applied between the rotor segment 11a and the core teeth 12t. The following description sets forth magnetic flux that flows between the rotor 13B and the core teeth 12t. FIG. 7 is a schematic diagram illustrating magnetic flux flowing between the rotor 13B and the core teeth 12t. In FIG. 7, the armature coil 12a and the field coil 12f are omitted.

The modulation magnetic flux ϕk shown in FIG. 7 flows from a core tooth 12t (left end in FIG. 7) to a salient pole 13c on one side (left end in FIG. 7) via a gap Go. After flowing through the rotor core 13b, the modulation magnetic flux ϕk flows from the other salient pole 13c on the other side (right end in FIG. 7) to another core tooth 12t (right end in FIG.

7) via the gap Go. As shown in FIG. 7, the modulation magnetic flux φk flows through the core tooth 12t closest to the salient pole 13c via the gap Go. With the flow of the modulation magnetic flux φk in this way, the rotor core 13b is rotated on the basis of the magnetic modulation principle.

When the electric rotating machine 10B is operated as an electric motor, a characteristic line L1 described in the first embodiment (refer to FIG. 5) is obtained. Although not shown, the rotor 11 may have the same configuration as the rotor 13B. In any case, as field magnetomotive force increases, motoring output torque increases. In the rotors 11 and 13B, field poles are generated with the supply of current to the field coil 12f. Accordingly, permanent magnets are not needed. Therefore, extra current is not required to be supplied to the armature coil 12a. Thus, current loss is minimized, and drag loss is not caused in an unloaded state by magnetic attractive force.

Third Embodiment

Figure 8:
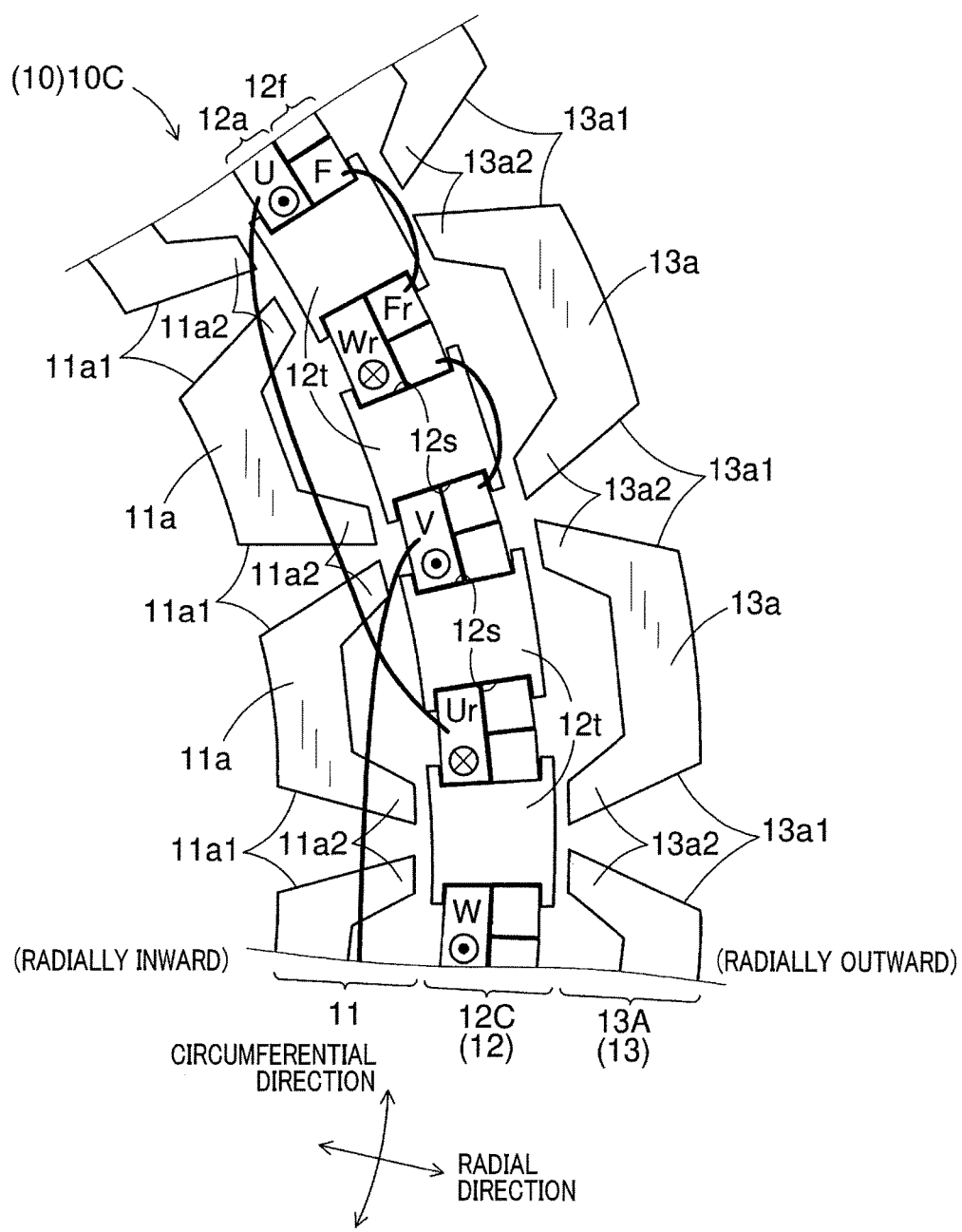
FIG. 8 is a schematic diagram illustrating a third configuration example of an electric rotating machine.

With reference to FIG. 8, a third embodiment of the present invention will be described. The second embodiment is described focusing on the differences from the first and second embodiments.

FIG. 8 is a schematic diagram illustrating an electric rotating machine 10C of the third embodiment. The electric rotating machine 10C shown in FIG. 8 is an example of an electric rotating machine 10. The electric rotating machine 10C includes rotors 11 and 13A and a stator 12C. Similar to the first embodiment, except for the rotors and the stator, the essential elements for configuring of the electric rotating machine 10C are not shown or described.

The electric rotating machine 10C is different from the first and second embodiments in that the electric rotating machine 10C includes the stator 12C having an armature coil 12a and a field coil 12f with a different style of winding, instead of the stator 12A (refer to FIG. 1). As shown in FIG. 8, the stator 12C has core teeth 12t which are each formed into a rectangular shape (close to a square shape), excepting ends thereof.

The armature coil 12a is composed of coil segments of a plurality of phases (three phases in the present embodiment). The cross-sectional shape of the coil segments is not discussed. In a configuration example of FIG. 8, the armature coil 12a is composed of U-, V- and W-phase coil segments U (Ur), V (Vr) and W (Wr). The U-phase coil segment U (Ur) corresponds to the U-phase coil segments U1 (U1r) and U2 (U2r) described in the first embodiment. Likewise, the V-phase coil segment V (Vr) corresponds to the V-phase coil segments V1 (V1r) and V2 (V2r), and the W-phase coil segment W (Wr) corresponds to the W-phase coil segments W1 (W1r) and W2 (W2r). In the present embodiment, winding is applied, taking an armature coil pole pitch P11 as three slots. The thick line indicated between the U-phase coil segments U and Ur, and the thick line indicated between the V-phase segments V and Vr schematically show linearly continuous portions of coil ends CE.

The field coil 12f is composed of field coil segments F (Fr). The field coil segments F (Fr) correspond to the field coil segments F1 (F1r), F2, (F2r), and F3 (F3r) of the first embodiment. In the present embodiment, winding is applied, taking a field coil pole pitch P13 as one slot. The thick lines each indicated between the field coil segments F and Fr schematically show a linear continuous portion of the coil ends CE.

When the electric rotating machine 10C is operated as an electric motor, a characteristic line L1 described in the first embodiment (refer to FIG. 5) is obtained. That is, in a configuration with a different shape of the core teeth 12t or a different style of winding of the armature coil 12a and the field coil 12f, motoring output torque increases with the increase of the field magnetomotive force. Although not shown, the same advantageous effects are obtained when one of or both of the rotors 11 and 13A have the same configuration as the rotor 13B described in the second embodiment (refer to FIG. 6). In the rotors 11 and 13A, since field poles are generated by supplying current to the field coil 12f, permanent magnets are not needed. Therefore, extra current is not required to be supplied to the armature coil 12a. Thus, current loss is minimized, and drag loss is not caused in an unloaded state by magnetic attractive force.

Fourth Embodiment

Figure 9:
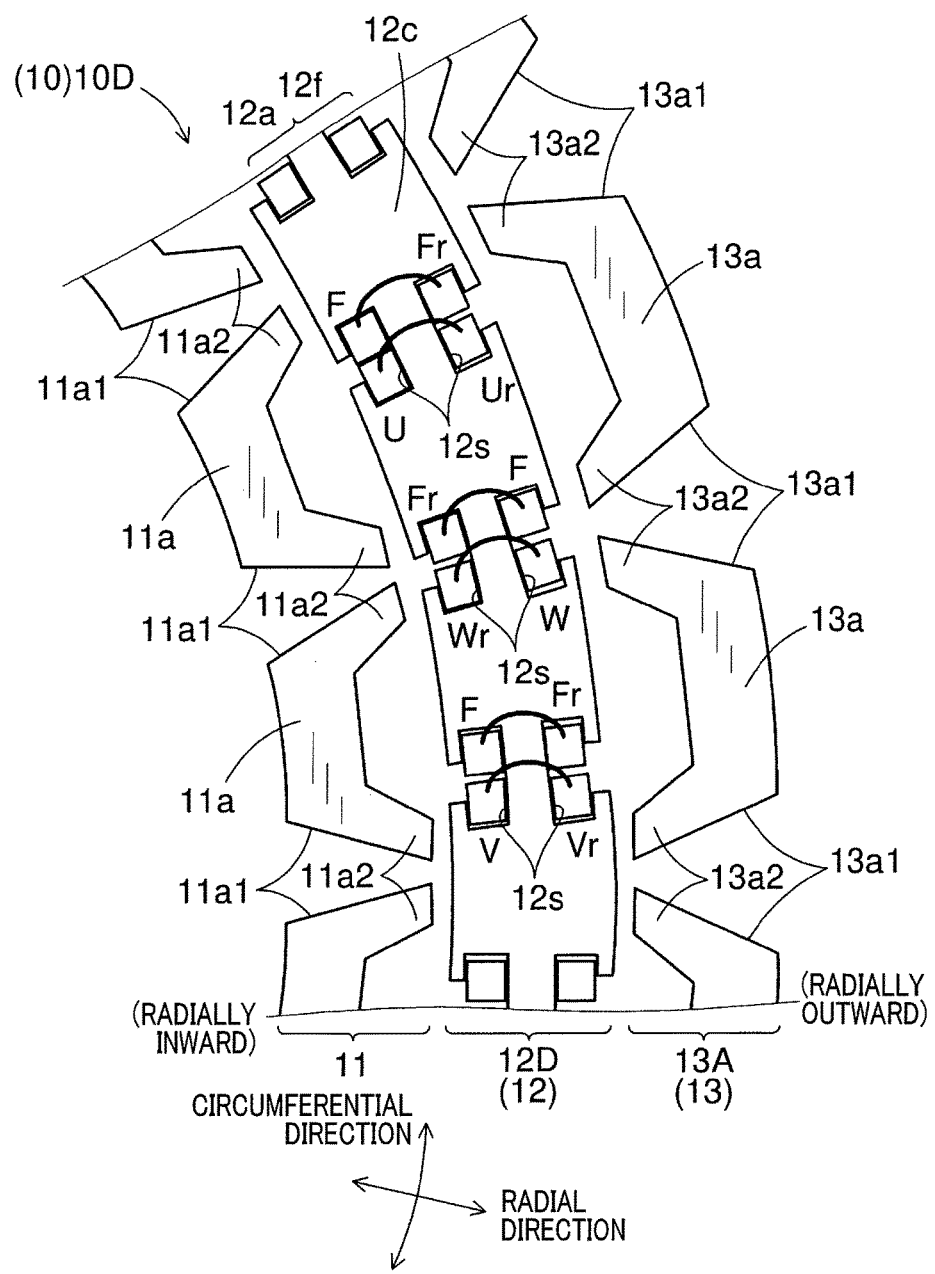
FIG. 9 is a schematic diagram illustrating a fourth configuration example of an electric rotating machine.

With reference to FIG. 9, a fourth embodiment will be described. The present embodiment is described focusing on the differences from the first to third embodiments.

FIG. 9 is a schematic diagram illustrating an electric rotating machine 10D. The electric rotating machine 10D shown in FIG. 9 is an example of an electric rotating machine 10. The electric rotating machine 10D includes rotors 11 and 13A and a stator 12D. Similar to the first embodiment, except for the rotors and the stator, the essential elements for configuring the electric rotating machine 10D are not shown or described.

The electric rotating machine 10D is different from the first to third embodiments in that the electric rotating machine 10D includes the stator 12D having an armature coil 12a and a field coil 12f with a different style of winding, instead of the stator 12A (refer to FIG. 1). In the stator 12D, slots 12s are provided radially outward and radially inward of each armature core segment 12c so as to be located at a plurality of radial positions (circumferentially different angle positions), and the armature coil 12a and the field coil 12f are separately wound in a radial direction. That is, unlike the first to third embodiments, the armature coil 12a and the field coil 12f are accommodated in the slots 12s according to toroidal winding to apply winding around the armature core segments 12c.

The armature coil 12a includes coil segments of a plurality of phases (three phases in the present embodiment). The cross-sectional shape of the coil segments is not discussed. In the configuration example shown in FIG. 9, similar to the third embodiment (refer to FIG. 8), the armature coil 12a is composed of U-, V- and W-phase coil segments U (Ur), V (Vr), and W (Wr). Similar to the third embodiment (refer to FIG. 8), the field coil 12f is composed of field coil segments F (Fr). The thick line indicated between the field coil segments F and Fr, and the thick line indicated between the U-phase coil segments U and Ur each schematically show a linearly continuous portion of coil ends CE.

When the electric rotating machine 10D is operated as an electric motor, a characteristic line L1 described in the first embodiment (refer to FIG. 5) is obtained. That is, in a configuration with a different shape of the armature core segments 12c or with a different winding style of the armature coil 12a and the field coil 12f, motoring output torque increases with the increase of the field magnetomotive force. Although not shown, the same advantageous effects are obtained when one of or both of the rotors 11 and 13A have the same configuration as the rotor 13B described in the second embodiment (refer to FIG. 6). In the rotors 11 and 13A, since field poles are generated by supplying current to the field coil 12f, permanent magnets are not needed. Therefore, extra current is not required to be supplied to the armature coil 12a. Thus, current loss is minimized, and drag loss is not caused in an unloaded state by magnetic attractive force.

Fifth Embodiment

Figure 10:
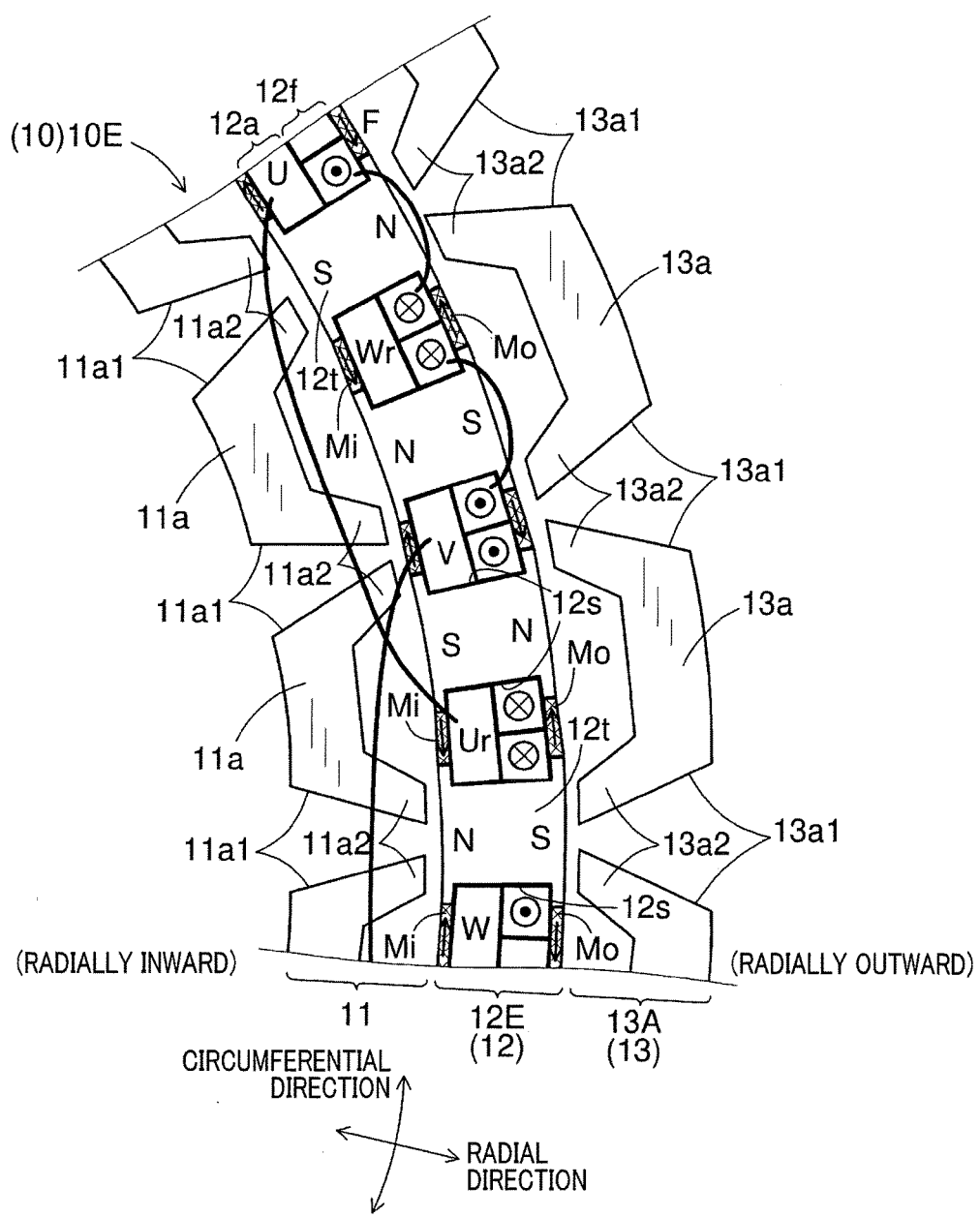
FIG. 10 is a schematic diagram illustrating a fifth configuration example of an electric rotating machine.

With reference to FIG. 10, a fifth embodiment will be described. The fifth embodiment is described focusing on the differences from the first to fourth embodiments.

FIG. 10 is a schematic diagram illustrating an electric rotating machine 10E. The electric rotating machine 10E shown in FIG. 10 is a modification of the electric rotating machine 10C described in the third embodiment (refer to FIG. 8). The electric rotating machine 10E is different from the first to fourth embodiments in that the electric rotating machine 10E includes a stator 12E instead of the stator 12C (refer to FIG. 8). The stator 12E includes a plurality of permanent magnets Mi and Mo in addition to the configuration of the stator 12C. The permanent magnets Mi and Mo are each provided between core teeth 12t (specifically, circumferentially protruded protrusions) to close the openings of slots 12s. Specifically, the permanent magnets Mi are each provided radially inward between the core teeth 12t, and the permanent magnets Mo are each provided radially outward between the core teeth 12t.

FIG. 10 shows an example of polarities (magnetic poles in the radial direction) generated in the core teeth 12t by supplying current to an armature coil 12a. A reference sign N indicates an N pole and a reference sign S indicates an S pole. The permanent magnets Mi and Mo are magnetized so as to be opposed to the polarities generated in the core teeth 12t. In other words, when the polarity of the core teeth 12t is N, the N-pole sides of the permanent magnets Mi and Mo are arranged, and when the polarity of the core teeth 12t is S pole, the S-pole sides of the permanent magnets Mi and Mo are arranged. This configuration has an effect of preventing the occurrence of magnetic leakage accompanying the generation of field poles in rotor segments 11a and 13a. The rest of the configuration is similar to the third embodiment, and thus the advantageous effects similar to those of the third embodiment are obtained.

Sixth Embodiment

With reference to FIGS. 11 to 18, a sixth embodiment will be described. The sixth embodiment is described focusing on the differences from the first to fifth embodiments.

Figure 11:
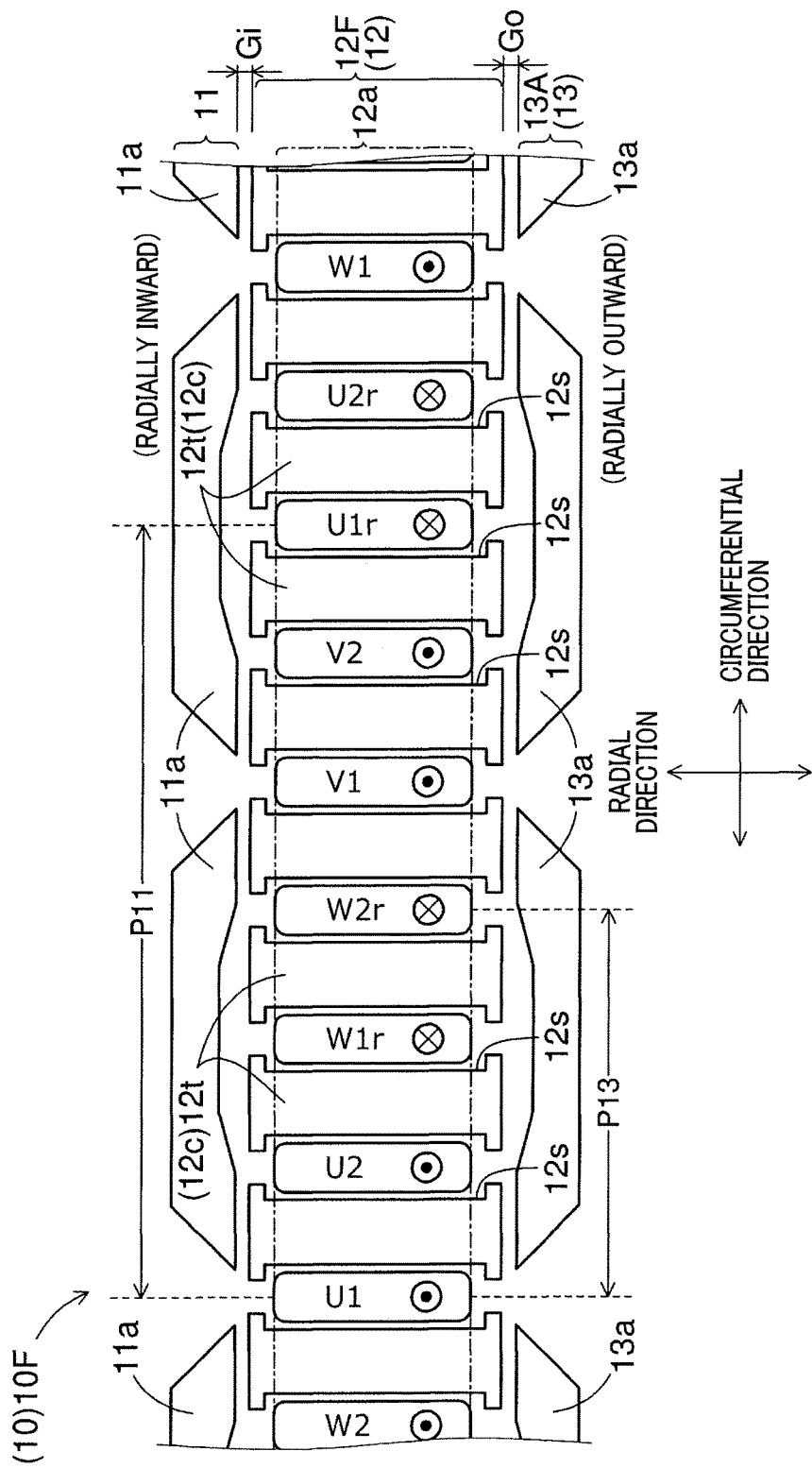
FIG. 11 is a schematic diagram illustrating a sixth configuration example of an electric rotating machine.

FIG. 11 is a schematic diagram illustrating an electric rotating machine 10F of the sixth embodiment. The electric rotating machine 10F shown in FIG. 11 is an example of an electric rotating machine 10. The electric rotating machine 10F includes rotors 11 and 13A and a stator 12F. Similar to the first embodiment, except for the rotors and the stator, the essential elements for configuring the electric rotating machine 10F are not shown or described. In FIG. 11, for clarity, the rotors 11 and 13A and the stator 12F are linearly arranged in a right-and-left direction. However, these elements are actually arranged in a circumferential direction (e.g., refer to FIGS. 8 to 10).

The electric rotating machine 10F is different from the first to fifth embodiments in that the electric rotating machine 10F includes the stator 12F around which an armature coil 12a is wound, instead of the rotor 13A (refer to FIG. 1). The armature coil 12a of the stator 12F shown in FIG. 11 is composed of U-, V- and W-phase coil segments U1 (U1r) and U2 (U2r), V1 (V1r) and V2 (V2r), and W1 (W1r) and W2 (W2r). Unlike the first embodiment, a field coil 12f is not provided or wound, and thus a plurality of field poles (N pairs in the present embodiment) generated in the stator 12F are realized by supplying zero-phase current or asymmetrical three-phase alternating current obtained by superimposing direct-current components on the armature coil 12a. In other words, with the supply of the asymmetrical three-phase alternating current, field poles equivalent to the current supply to the field coil 12f are generated in the stator 12F.

Figure 12:
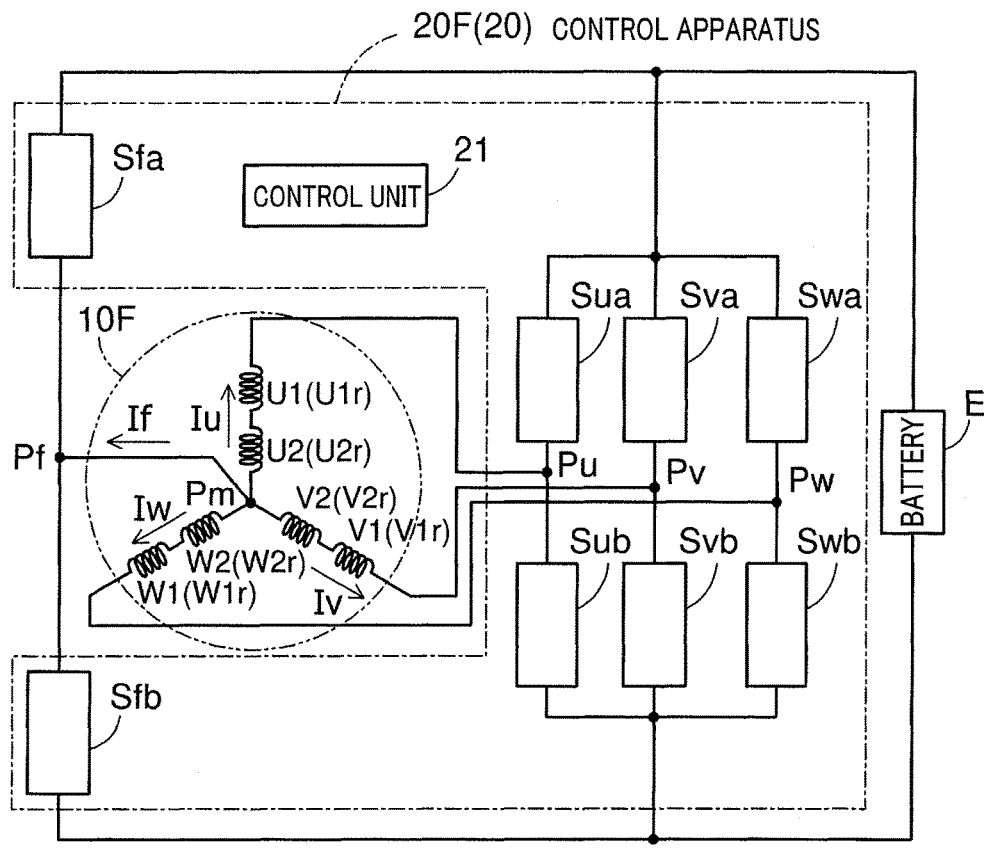
FIG. 12 is a schematic diagram illustrating a second configuration example of a control apparatus.

FIG. 12 is a schematic diagram illustrating a control apparatus 20F. The control apparatus 20F shown in FIG. 12 is different from the first embodiment in that the control apparatus 20F includes switching units Sfa and Sfb instead of the switching unit Sf of the control apparatus 20A according to the first embodiment (refer to FIG. 3). The switching units Sfa and Sfb are connected in series, while being connected to both ends of a battery E. The switching units Sfa and Sfb have a connection point Pf therebetween which is connected to a neutral point Pm.

In the following description, U-phase current Iu flows from the neutral point Pm to a connection point Pu via U-phase coil segments U1 and U2. Similarly, V-phase current Iv flows from the neutral point Pm to a connection point Pv via V-phase coil segments V1 and V2. A W-phase current Iw flows from the neutral point Pm to a connection point Pw via W-phase coil segments W1 and W2.

Figure 13:
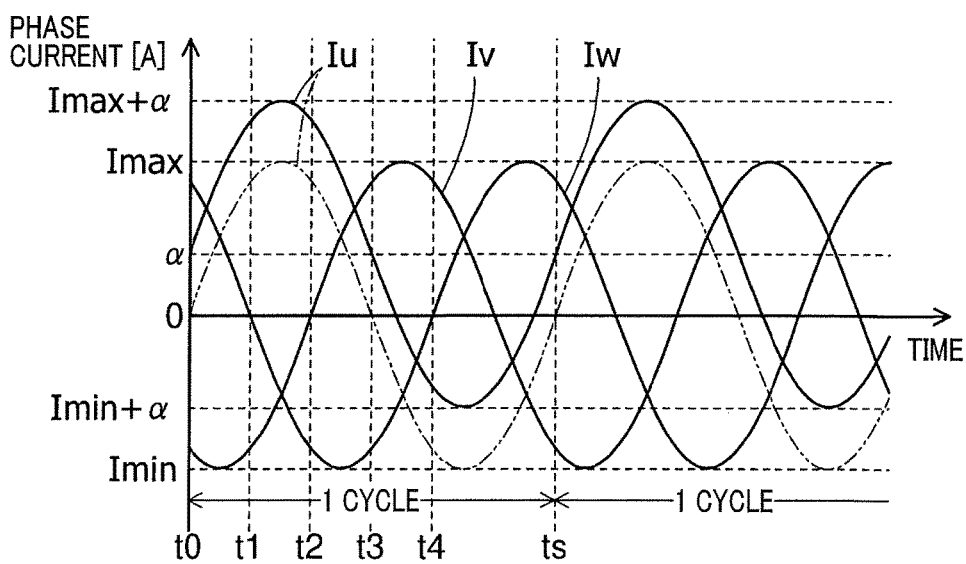
FIG. 13 is chart illustrating change of phase current with time.

FIG. 13 is a chart illustrating change of phase current with time. Specifically, FIG. 13 shows a control example of the U-, V- and W-phase currents Iu, Iv, and Iw by the control apparatus 20F. In the chart, the vertical axis indicates phase current and the horizontal axis indicates time. A period from time t0 to time ts is taken as one cycle. When control is performed using symmetrical three-phase alternating current, all of the U-, V- and W-phase currents Iu, Iv, and Iw are permitted to change in a period between a minimum current value Imin and a maximum current value Imax. In this case, a field current If becomes 0 [A].

To pass the field current If, the asymmetrical three-phase alternating current only has to be passed to an armature coil 12a (i.e., the U-, V- and W-phase coil segments U1 and U2, V1 and V2, and W1 and W2). The control example shown in FIG. 13 is an example of the case where the asymmetrical three-phase alternating current is realized by superimposing direct-current components (current α) on the U-phase current Iu. In this case, the U-phase current Iu is permitted to change in a period between a minimum current value Imin+α and a maximum current value Imax+α. Although not shown, the direct-current components may be superimposed on the V-phase current Iv, or may be superimposed on the W-phase current Iw. Alternatively, the direct-current components may be superimposed on the currents of two phases among the U-, V- and W-phase currents Iu, Iv, and Iw. In any case, since the field current If satisfies If>0, ON/OFF of the switching units Sfa and Sfb is controlled and the current is returned to the battery E (or discharged by grounding).

Vector diagrams at times t1, t2, t3, t4 and t5 of FIG. 13 are shown in FIGS. 14 to 18. In these diagrams, an armature rotation magnetic field Ata exhibits a magnetic field (rotation magnetic field) generated by the current supply to the armature coil 12a, while a static field magnetic field ATf exhibits field poles (static magnetic field) generated by the supply of the asymmetrical three-phase alternating current. The following description sets forth a vector algorithm based on a concept of mixing motion vectors.

Figure 14:
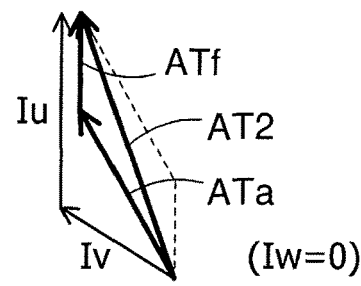
FIG. 14 is a schematic diagram illustrating magnetomotive force vectors at time t1 of FIG. 13.

The vector diagram of FIG. 14 shows magnetomotive force vectors when the U- and V-phase currents Iu and Iv satisfy Iu>0 and Iv<0, respectively, and the W-phase current Iw becomes 0 [A]. The U- and V-phase currents Iu and Iv provide a resultant vector which is equal to the resultant vector of the static field magnetic field ATf and the armature rotation magnetic field ATa. The second rotation magnetic field AT2 corresponds to a resultant vector generated by synergistic action of the static field magnetic field ATf and the armature rotation magnetic field Ata (the same applies to FIGS. 15 to 17 described below). In the resultant vector of the second rotation magnetic field AT2, frequency is different between the static field magnetic field ATf and the armature rotation magnetic field ATa. Accordingly, the resultant vector of the second rotation magnetic field AT2 does not correspond to a resultant of pure static vectors, but is used for clarifying the concept of the second rotation magnetic field AT2.

Figure 15:
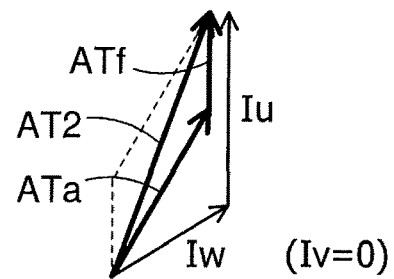
FIG. 15 is a schematic diagram illustrating magnetomotive force vectors at time t2 of FIG. 13.

The vector diagram of FIG. 15 shows a magnetomotive force vector when the U- and W-phase currents Iu and Iw satisfy Iu>0 and Iw<0, respectively, and the V-phase current Iv becomes 0 [A]. The U- and W-phase currents Iu and Iw provides a resultant vector which is equal to the resultant vector of the static field magnetic field ATf and the armature rotation magnetic field ATa.

Figure 16:
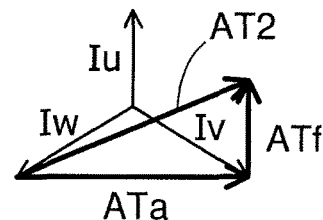
FIG. 16 is a schematic diagram illustrating magnetomotive force vectors at time t3 of FIG. 13.

The vector diagram of FIG. 16 shows magnetomotive force vectors when the U-, V- and W-phase currents Iu, Iv, and Iw satisfy Iu>0, Iv>0, and Iw<0, respectively. The U-, V- and W-phase currents Iu, Iv, and Iw provide a resultant vector which is equal to the resultant vector of the static field magnetic field ATf and the armature rotation magnetic field ATa.

Figure 17:
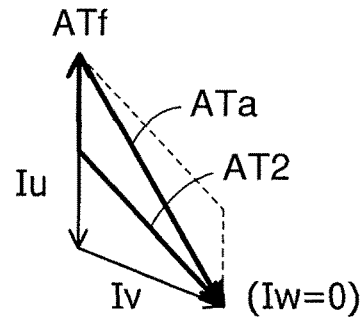
FIG. 17 is a schematic diagram illustrating magnetomotive force vectors at time t4 of FIG. 13.

The vector diagram of FIG. 17 shows magnetomotive force vectors when the V- and W-phase currents Iv and Iw satisfy Iv<0 and Iw>0, respectively, and the U-phase current Iu becomes 0 [A]. The V- and W-phase currents Iv and Iw provides a resultant vector which is equal to the resultant vector of the static field magnetic field ATf and the armature rotation magnetic field ATa.

Figure 18:
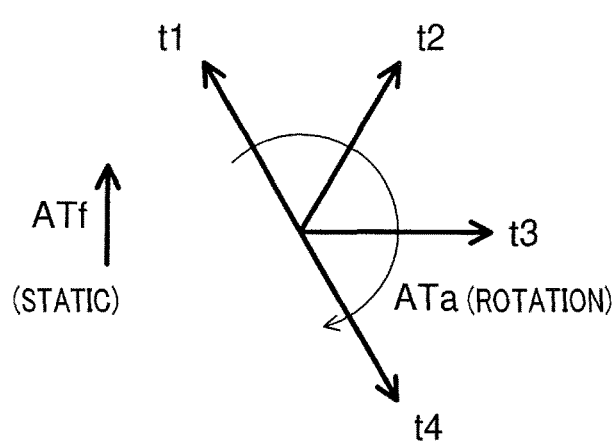
FIG. 18 is a schematic diagram illustrating static magnetic field and armature rotation magnetic field to be generated.

The static field magnetic field ATf and the armature rotation magnetic field ATa shown in FIGS. 14 to 17 are collectively shown in FIG. 18. As shown in FIG. 18, the static field magnetic field ATf is a static magnetic field, whereas the armature rotation magnetic field Ata is a magnetic field that rotates (changes) with time. Therefore, by the synergistic action of the static field magnetic field ATf and armature rotation magnetic field Ata to be generated, the second rotation magnetic field AT2 is generated in the stator 12A.

Instead of superimposing the direct-current components, power supply may be received from the battery E to perform ON/OFF control over the switching units Sfa and Sfb to thereby pass a zero-phase current. A single-phase zero-phase current becomes a field current If and passed being superimposed on the currents flowing through the three-phase armature coil 12a (i.e., U-, V- and W-phase coil segments U1 and U2, V1 and V2, and W1 and W2). As a matter of course, the U-, V- and W-phase currents Iu, Iv, and Iw are passed by the ON/OFF control of the switching units Sua, Sva, Swa, Sub, Svb, and Swb. The field current If generates the static magnetic field ATf, while the U-, V- and W-phase currents Iu, Iv, and Iw generate the armature rotation magnetic field ATa. By the synergistic action of the static field magnetic field ATf and armature rotation magnetic field Ata to be generated, the second rotation magnetic field AT2 is generated in the stator 12A.

When the electric rotating machine 10F is operated as an electric motor, a characteristic line L1 described in the first embodiment (refer to FIG. 5) is obtained. That is, in a configuration of the stator 12F including no field coil 12f but including the armature coil 12a, motoring output torque increases with the increase of field magnetomotive force. Although not shown, the same advantageous effects are obtained when one of or both of the rotors 11 and 13A are configured similar to the rotor 13B described in the second embodiment (refer to FIG. 6). The rotors 11 and 13A supply, to the armature coil 12a, zero-phase current or asymmetrical three-phase alternating current obtained by superimposing direct-current components to thereby generate field poles. Accordingly, permanent magnets are not needed. Therefore, extra current is not required to be passed to the armature coil 12a. Thus, current loss is minimized, and drag loss is not caused in an unloaded state by magnetic attractive force.

Other Embodiments

Some modes of implementing the present invention have so far been described according to the first to sixth embodiments. However, the present invention should not be construed as being limited to the modes described above. In other words, the present invention may be implemented in various modes without departing from the spirit of the present invention. For example, the following modes may be implemented.

Figure 19:
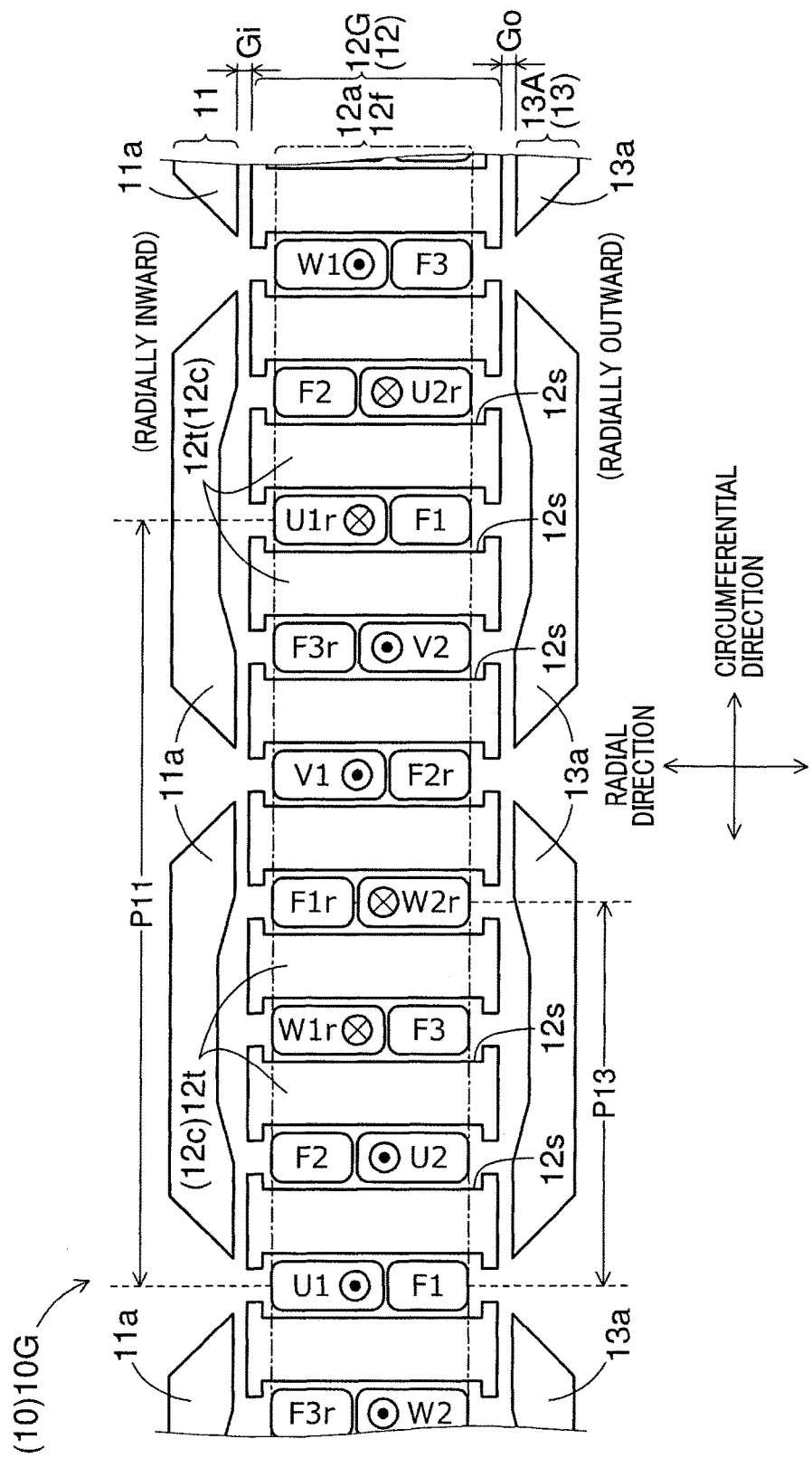
FIG. 19 is a schematic diagram illustrating a seventh configuration example of an electric rotating machine.

The first, second, third, and fifth embodiments described above are so configured that, in all of the slots 12s, the armature coil 12a is wound on one side in a radial direction (e.g., radially inward), while the field coil 12f is wound on the other side (e.g., radially outward) (refer to FIGS. 1, 6, 8, and 10). Alternative to this, the armature coil 12a and the field coil 12f may be switched in one or more slots 12s, and wound on one side and on the other side in a radial direction. For example, FIG. 19 shows an electric rotating machine 10G that is a modification of the electric rotating machine 10A described in the first embodiment (refer to FIG. 1). Specifically, FIG. 19 shows a configuration example in which the armature coil 12a and the field coil 12f are switched every other slot 12s in an alternate manner and wound around the slots 12s. Although not shown, the armature coil 12a and the field coil 12f may be switched every two or more slots 12s in an alternate manner and wound around the slots 12s. The same applies to the electric rotating machines 10 (10B, 10C, and 10E) described in the second, third, and fifth embodiments, respectively. In any of the configurations, field poles of an equal magnitude can be generated in the armature core segments 12c (armature core). That is, the rotors 11 and 13 can be rotated by equal torque.

The first to sixth embodiments described above are so configured that the armature coil 12a and the field coil 12f are each wound in a three-phase mode (U, V and W phases) (refer to FIGS. 1, 6 and 8 to 11). As an alternative to this, the armature coil 12a and the field coil 12f may each be wound in a multi-phase mode of four or more phases. Since the difference is only the number of phases, the advantageous effects similar to those of the first to sixth embodiments can be obtained.

In the first to sixth embodiments described above, the electric rotating machines 10 (10A to 10F) are configured to be of a double rotor type having a plurality of rotors 11 and 13 and the stator 12 (refer to FIGS. 1, 6, and 8 to 11). Alternative to this, an electric rotating machine 10 of a single-rotor type may be configured so as to include one of the rotors 11 and 13, and the stator 12. Since the difference is only the number of rotors, the advantageous effects similar to those of the first to sixth embodiments can be obtained, except that torque decreases compared with the double-rotor type.

The first to sixth embodiments are configured by applying a combination of M=6, N=12, and K=18 that satisfy the relational expression of M+N=K, where M is the number of pairs of magnetic poles generated by the armature coil 12a, N is the number of pairs of field poles generated in the rotors 11 and 13 by the field coil 12f, and K is the number of rotor segments 11a and 13a (refer to FIGS. 1, 6, and 8 to 11). Alternative to this, the electric rotating machine may be configured by applying a combination of M, N, and K (all are natural numbers) that satisfy a relational expression of |M±N|=K, other than the combination of M=6, N=12, and K=18. For example, a combination of M=18, N=6, and K=12 (example of M−N=K) may be used. Depending on the type or the rating of the electric rotating machine 10 (10A to 10G), optimal numerical values may be applied. In any case, when the relational expression is satisfied, a magnetic modulation principle acts in a relationship between the stator 12, and the rotors 11 and 13, thereby generating magnetic transmission torque. Thus, the advantageous effects similar to those of the first to sixth embodiments can be obtained.

The fifth embodiment described above is so configured that one permanent magnet Mi or Mo is provided between the core teeth 12t (specifically, the protrusions circumferentially protruding radially inward and radially outward of the stator 12E) (refer to FIG. 10). Alternative to this, one or more permanent magnets Mi or Mo may be configured by a plurality of permanent magnet segments. Each permanent magnet segment is in a size smaller than the permanent magnet Mi or Mo. Since the difference is only whether the number of magnets is one or more, the advantageous effects similar to those of the fifth embodiment can be obtained.

The first and third to sixth embodiments described above is so configured that the rotor segments 11a and 13a each have circumferential end faces provided with the chamfered portions 11a1 and circumferential end portions provided with the protrusions 11a2 (refer to FIGS. 1, 4, 6, and 8 to 11). Alternative to this, the chamfered portions 11a1 may be provided to one circumferential end face of each of the rotor segments 11a and 13a. The protrusions 11a2 may be provided to portions other than the circumferential end portions. In any of the configurations, the modulation magnetic flux φk is permitted to flow to thereby rotate the rotors 11 and 13 on the basis of the magnetic modulation principle. Thus, the advantageous effects similar to those of the first and third to sixth embodiments can be obtained.

Advantageous Effects

According to the foregoing embodiments and modifications, the following advantageous effects can be obtained.

(1) In the electric rotating machine 10 (10A to 10G), the stator 12 has the armature coil 12a wound around the armature core segments 12c with M pairs of poles, and has N pairs of field poles (field coil 12f and static field magnetic field ATf). The rotor 13 has K soft magnetic members 11a and 13a including a plurality of protrusions 11a2 on a side facing the stator 12. The armature coil 12a, the field poles, and the soft magnetic members 11a and 13a satisfy a relational expression of |M±N|=K (refer to FIGS. 1, 6, 8 to 11, and 19). With this configuration, the new second rotation magnetic field AT2 is generated in the stator 12, from the armature rotation magnetic field Ata of M pairs of poles, and the static field magnetic field ATf of N pairs of poles. Rotors 11 and 13 serving as modulators are rotated by the second rotation magnetic field AT2. Since the rotors 11 and 13 are rotated based on the magnetic modulation principle, the performance of the electric rotating machine can be improved with a brushless structure.

(2) The N pairs of field poles are generated by supplying current to the field coil 12f (F1, F1r, F2, F2r, F3, and F3r) wound around the armature core segments 12c (refer to FIGS. 1, 6, 8 to 10, and 19), or generated by supplying zero-phase current or asymmetrical three-phase alternating current (U-, V- and W-phase currents Iu, Iv and Iw) obtained by superimposing direct-current components on the armature coil 12a (refer to FIGS. 11 to 18). With this configuration, since the field poles (static field magnetic field ATf) are reliably generated in the stator 12, the magnetic modulation principle applies and the performance of the electric rotating machine 10 can be improved with a brushless structure. In addition, when the field poles are generated in the stator 12 with the supply of the asymmetrical three-phase alternating current, the number of turns of the armature coil 12a can be increased by an amount of the unnecessary field coil 12f. Thus, the performance of the electric rotating machine 10 can be improved.

(3) The electric rotating machine is configured to include two rotors 11 and 13 arranged sandwiching the stator 12 via the gaps Gi and Go (refer to FIGS. 1, 6, 8 to 11, and 19). The electric rotating machine may be configured to include three or more rotors. Specifically, a plurality of rotors 11 may be provided radially inward, or a plurality of rotors 13 may be provided radially outward. In any case, since a gap area serving as a torque generation surface can be increased, the performance of the electric rotating machine 10 can be more improved.

(4) The K soft magnetic members 11a and 13a relating to one of or both of the rotors 11 and 13 among the plurality of rotors 13 are rotor segments 11a and 13a which are magnetically isolated from each other (refer to FIGS. 1, 8 to 11, and 19). With this configuration, a magnetic circuit passed between the rotor segments is determined to independently have a free magnetic potential, so that the performance of the electric rotating machine 10 can be enhanced. In addition, a magnetic material is used for the rotor segments 11a and 13a, so that magnetic flux is prevented from leaking from between the soft magnetic members 11a and 13a. Therefore, the strong field magnetic flux is effectively magnetically modulated and good torque increase action is achieved.

(5) One rotor 11 has the K rotor segments 11a and the other rotor 13B is configured to have a gear shape with K salient poles 13c being provided thereto (refer to FIGS. 6 and 7). With this configuration, the other rotor 13B is configured to have a gear shape, and thus the rotor segments 11a configured in one rotor 11 can be easily designed to have endurance against centrifugal force.

(6) The stator 12 has permanent magnets Mi and Mo each arranged between armature core segments 12c (including the core teeth 12t) adjacent to each other, and the permanent magnets Mi and Mo are magnetized so as to be opposed to the polarities of the armature core segments 12c (refer to FIG. 10). With this configuration, the permanent magnets Mi and Mo magnetized so as to be opposed to the polarities of the armature core segments 12c have an effect of preventing magnetic leakage from between the armature core segments 12c (core teeth 12t in particular). Therefore, the performance of the electric rotating machine can be more improved.

(7) One or more rotor segments 11a and 13a have a chamfered portion 11a1 in one or both circumferential end faces (refer to FIGS. 1, 6, 8 to 11, and 19). With this configuration, magnetic flux is prevented from leaking from the circumferential end faces. Therefore, the strong field magnetic flux is more effectively magnetically modulated and the torque can be further increased.

(8) One or more rotor segments 11a and 13a have the protrusions 11a2 in both circumferential ends (refer to FIGS. 1, 6, 8 to 11, and 19). With this configuration, magnetic flux flows into one of both protrusions 11a2 and flows out of the other protrusion 11a2. That is, the inflow and outflow of the magnetic flux in the soft magnetic members 11a and 13a can be separated from those in the armature core segments (specifically, the core teeth 12t), and flowing directions of the magnetic flux are prevented from being reversed at one protrusion 11a2. Therefore, the magnetic modulation principle is further enhanced, while the performance of the electric rotating machine 10 is further improved.

What is claimed is:

1. An electric rotating machine comprising:
    a stator serving as an armature including at least armature core segments and an armature coil; and
    a radially outer rotor and a radially inner rotor, both rotatably provided relative to the stator with gaps therebetween,
    wherein the stator has the armature coil wound around the armature core segments with M pairs of poles (M being a natural number), and N pairs of field poles (N being a natural number),
    each of the outer and inner rotors has K (K being a natural number) soft magnetic members including a plurality of protrusions on a side facing the stator, and
    the armature coil, the field poles, and the soft magnetic members satisfy a relational expression of $|M\pm N|=K$.

2. The electric rotating machine of claim 1, wherein the N pairs of field poles are generated by supplying current to a field coil wound around the armature core segments, or generated by supplying zero-phase current or asymmetrical three-phase alternating current obtained by superimposing direct-current components on the armature coil.

3. The electric rotating machine of claim 1, wherein the outer and inner rotors are arranged sandwiching the stator via the gaps.

4. The electric rotating machine of claim 3, wherein the K soft magnetic members relating to one of or each of the outer and inner rotors are rotor segments that are magnetically isolated from each other.

5. The electric rotating machine of claim 4, wherein
    one rotor of the outer and inner rotors has the K rotor segments, and
    the other rotor of the outer and inner rotors is configured to have a gear shape, with K salient poles being provided thereto.

6. The electric rotating machine of claim 1, wherein
    the stator has permanent magnets each of which is arranged between armature core segments adjacent to each other, and
    the permanent magnets are magnetized so as to be opposed to polarities of the armature core segments.

7. The electric rotating machine of claim 1, wherein one or more of the soft magnetic members have one or both circumferential end faces that are chamfered.

8. The electric rotating machine of claim 1, wherein one or more soft of the magnetic members have both circumferential ends having the protrusions.

* * * * *